United States Patent [19]
Watson

[11] Patent Number: 4,847,863
[45] Date of Patent: Jul. 11, 1989

[54] EXPANDABLE MODULAR DATA MODEM

[76] Inventor: Bruce W. Watson, Quadran, Inc., One Quad Way, Norcross, Ga. 30083-2919

[21] Appl. No.: 783,783

[22] Filed: Oct. 3, 1985

[51] Int. Cl.$^4$ .......................................... H04M 11/00
[52] U.S. Cl. ........................................ 375/8; 361/413; 379/98; 364/708
[58] Field of Search ............. 179/2 DP; 361/380, 390, 361/391, 392, 393, 394, 397, 399, 422, 395, 412, 413, 415; 364/708, 700, 705, 709; 455/90, 347, 348, 349, 195, 128; 375/7, 8; 312/7.1; 379/93, 94, 96, 97, 98

[56] References Cited

U.S. PATENT DOCUMENTS

| | | | |
|---|---|---|---|
| 3,955,051 | 5/1976 | Bitzer | 379/97 |
| 4,012,672 | 3/1977 | Douglass et al. | 361/422 |
| 4,215,243 | 7/1980 | Maxwell | 379/98 |
| 4,229,827 | 10/1980 | Bowman | 455/87 |
| 4,387,440 | 6/1983 | Eaton | 379/94 |
| 4,392,023 | 7/1983 | Sears | 379/98 |
| 4,395,559 | 7/1983 | Pierce et al. | 179/2 DP |
| 4,417,009 | 11/1983 | Pierce | 179/2 DP |
| 4,440,988 | 4/1984 | Heatherington | 379/98 |
| 4,455,661 | 6/1984 | Qureshi | 375/8 |
| 4,466,106 | 8/1984 | Serrano | 375/9 |
| 4,481,426 | 11/1984 | Nakagawa et al. | 375/121 |
| 4,496,943 | 1/1985 | Greenblatt | 364/708 |
| 4,524,244 | 6/1985 | Faggin et al. | 379/377 |
| 4,530,066 | 7/1985 | Ohwaki et al. | 361/391 |
| 4,543,450 | 9/1985 | Brandt | 379/98 |
| 4,640,989 | 2/1987 | Riner | 379/94 |

OTHER PUBLICATIONS

IBM Asynchronous Communications Adapter Instructions for IBM PC, Apr. 1983, 18 pages.
Micro Systems Magazine, Mar. 1984, p. 160, Bizcomp Advertisement.

Primary Examiner—Benedict V. Safourek
Attorney, Agent, or Firm—Oltman and Flynn

[57] ABSTRACT

Expandable data modem for data transmission of digital data at certain defined data rates which includes a base for mounting those components of the modem which are data-rate independent and a sub-base for mounting all data-rate-dependent components, and a two-part plug-in connector for detachably plugging the sub-base into the base. In this way the modem can be expanded to higher data rates by simply replacing the sub-base with its data rate-dependent components instead of replacing the entire modem. In a preferred embodiment the base and the sub-base are two printed circuit boards joined by a card-edge connector.

13 Claims, 5 Drawing Sheets

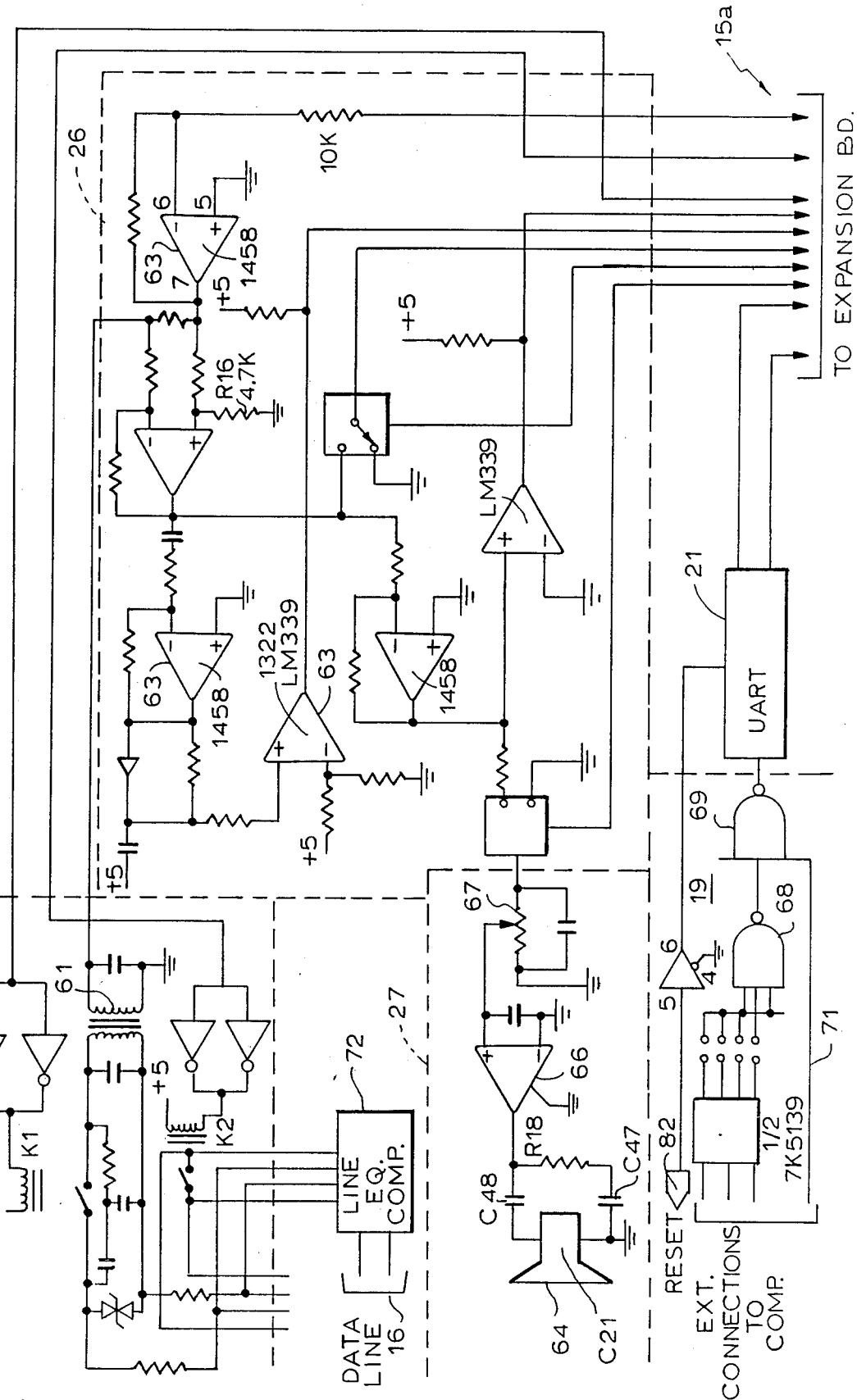
FIG. 6 BASE CCT. BOARD

EXPANDABLE MODULAR DATA MODEM

BACKGROUND OF THE INVENTION

The invention relates to data modems and more particularily to expandable data modems of modular construction.

Data modems are widely used for transmitting digitally encoded information through information channels, that are typically of bandwidth limited type, such as voice channels that have a bandwidth substantially in the range from 250–3500 Herz.

Digital information, before it can be transmitted through such a channel, normally must be converted to a form that is suitable for transmission over long distance-voice channels.

Long distance voice channels typically include many transmission improving and correcting devices, such as amplifiers, inductive loading coils and so forth, which enhance voice transmission but in turn in certain respects present problems for data transmission.

In order to be transmitted over such voice channels, the data must first be modulated to a suitable form before they enter the line. When the modulated data enter the other end of the voice channel, they must again be demodulated back to their original form. In a two-way data channel, there is therefore a combined modulator-demodulator at each end, usually called modem.

Modems for low data speeds, such as e.g. 300–1200 data bits per second also called "bauds per second" or simply "baud" are typically quite simple devices, consisting of a combined frequency-shift modulated oscillator combined with a frequency-modulated detector at each end. Such simple modems, however, are usually suitable only for limited data speeds. When greater data speeds are required, modems of more complex construction are required, which use complex modulation techniques for overcoming the physical limitations of the voice and data channel. It follows that these more complex modems typically require auxilliary circuits to support them; they are also more complex and accordingly more expensive, and the more so, the higher the data rate.

Such auxiliary circuits include the power supply, the clock generator and line equalizing circuitry for improving certain transmission parameters of the voice channel. It follows that all these auxiliary circuits as well as the modem become more complex at high data rates.

A modem is typically inserted between a computer and a data line, and as such includes a number of circuits that, to one side, interact with the data line for controlling it, and to the other side, interact with the computer. These are basic circuits that are required, almost identically the same for every modem.

With the present state of the art, when one buys a modem for a computer, it may either be a standalone modem that is logged in via a RS232 or similar port on the computer, or it may be a drop-in card for the personal computer. There are a number of different modems of this particular fashion, many of them are for 300 baud, and many of them are either 300 or 1200 baud but selectable. Some of the more expensive modems go up to 300/1200/2400/4800, baud or higher. In the past, because of the slowness of technology, one would create a modem to handle data at a certain baud rate or a certain range of baud rates, but as the state-of-the-art advances and the need arises for a better modem, it is always necessary to buy a completely new modem and to discard the old one, even if possibly fifty percent of the components on the old modem would be wasted, because they would again be required for the new modem.

It is therefore a primary object of the present invention to provide a type of modem that is upgradable to higher and better performance without the need for completely discarding the entire modem, but that is constructed such that only a small part of the modem can be taken out and replaced with a new part, so that the upgrading can be done at much less expense, than required if the entire modem is replaced.

PRIOR ART

Inventors have in the past aimed at constructing modems in which the cost of updating the modem was as low as possible.

U.S. Pat. No. 4,229,827 shows a single-voltage-controlled oscillator modem.

U.S. Pat. No. 4,395,590 shows a line-powered modem for reducing the cost of the power supply.

U.S. Pat. No. 4,417,099 shows a line-powered modem with an electro-optical insulator on the line side.

U.S. Pat. No. 4,455,661 shows a dual processor digital modem having one processor for arithmetic data manipulation and another processor for providing the line control functions.

It appears, however, that none of the prior art inventions have not solved the problem of an upgradable modem, because they have addressed only a single part of the variables involved in upgrading a modem.

SUMMARY OF THE INVENTION

The invention provides an expandable modem, in which the base circuitry for the modem incorporates the data line interconnections, a coupling transformer, a computer bus interface, and decoding circuitry, which is fixed and becomes the base or main circuit board of the modem. The computer bus interface may be a direct-connect internal plug-in printed circuit board or may be interfaced via an RS232 type connection for an externally located modem. The circuitry required to implement a specific data speed or a range of speeds, is contained on an expansion sub-base circuit board. This circuit board is advantageously plugged into the base circuit board by suitable readily disconnectable means to form a complete unit. This concept allows for the modular upgrading of the modem without the necessity of completely replacing the modem. The prior art of modems for computers have not provided such expansion capabilities.

A still further feature of this modem allows for the anticipation of technology that has not yet been designed, for even higher speeds than are currently available. This new circuitry would be constructed in a manner such that it would also be an expansion board. One could then purchase a new expansion board and then upgrade the modem to a new speed at just a fraction of the cost of a new modem.

Further objects and advantages of this invention will be apparent from the following detailed description of presently preferred embodiments which are illustrated schematically in the accompanying drawings.

BRIEF DESCRIPTION OF THE DRAWINGS

FIG. 6 is a schematic circuit diagram showing in abbreviated form some of the circuit details of a base circuit.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

In the appended drawing only those parts that are necessary for the understanding of the invention are shown and immaterial details have beem omitted.

Figure 1:
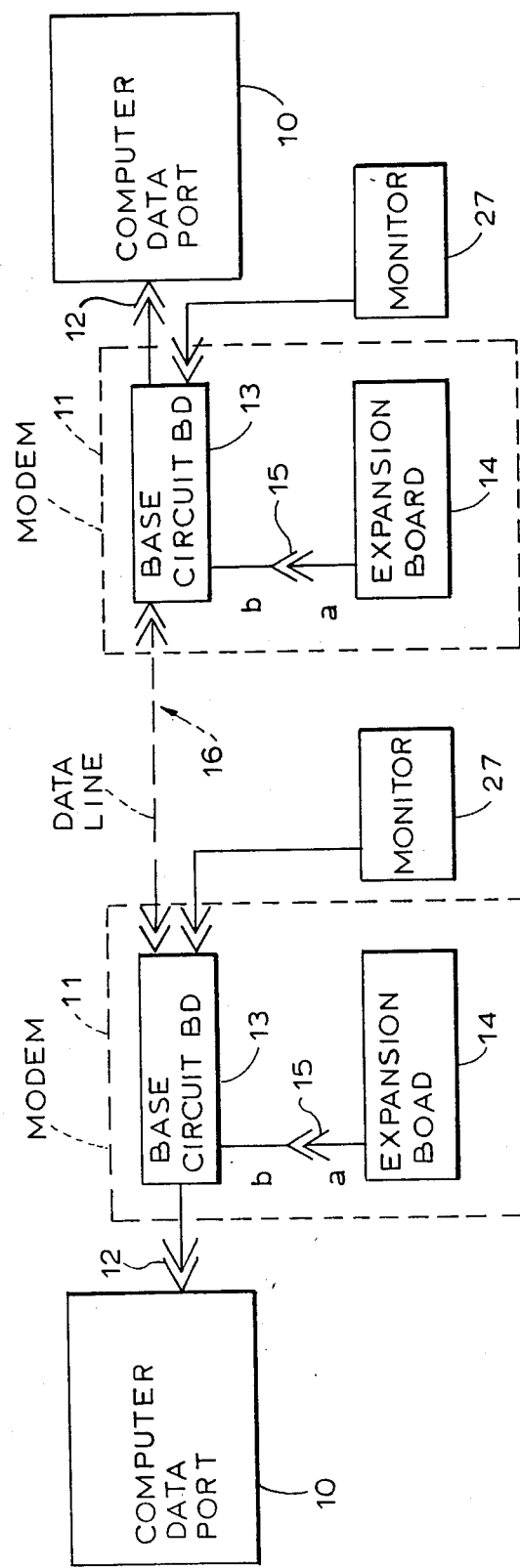
FIG. 1 is a simplified block diagram of the invention and its connected parts.

FIG. 1 shows two computers 10, each having a data port 12, which may be any suitable type of data port, such as a RS-232, RS432 or like, connected to a modem 11, which, according to the invention, includes two basic parts, namely a base circuit board 13 and an expansion circuit board 14 connected to the base circuit board 13 through a detachable plug connection 15, typically comprising a male part a and a female part b.

The two modems are interconnected by a data line 16 which is typically a voiceband telephone line but may not be a line, but any suitable type voice channel such as a carrier channel, a digital carrier channel or a microwave channel, an optical fiber or a satellite channel or any combination thereof.

The base circuit board 13 of the modem 11, according to the invention, includes those parts of the modem that normally are not variable, as the data rate increases, and the expansion board 14 includes those parts that relate directly to the data speed. As the demands to the modem require increasing data rate, the components of the expansion circuit board 14 become more complex and expensive.

The expansion circuit board 14 is therefore, in the preferred embodiment, detachably attached to the base circuit board 13 through the link 15, so that, as the required data rate increases, the old expansion board 14 can be detached and replaced by a new expansion board constructed for the required higher data rate. The exact structure of the data link 15 is not important to the scope of the invention.

Figure 2:
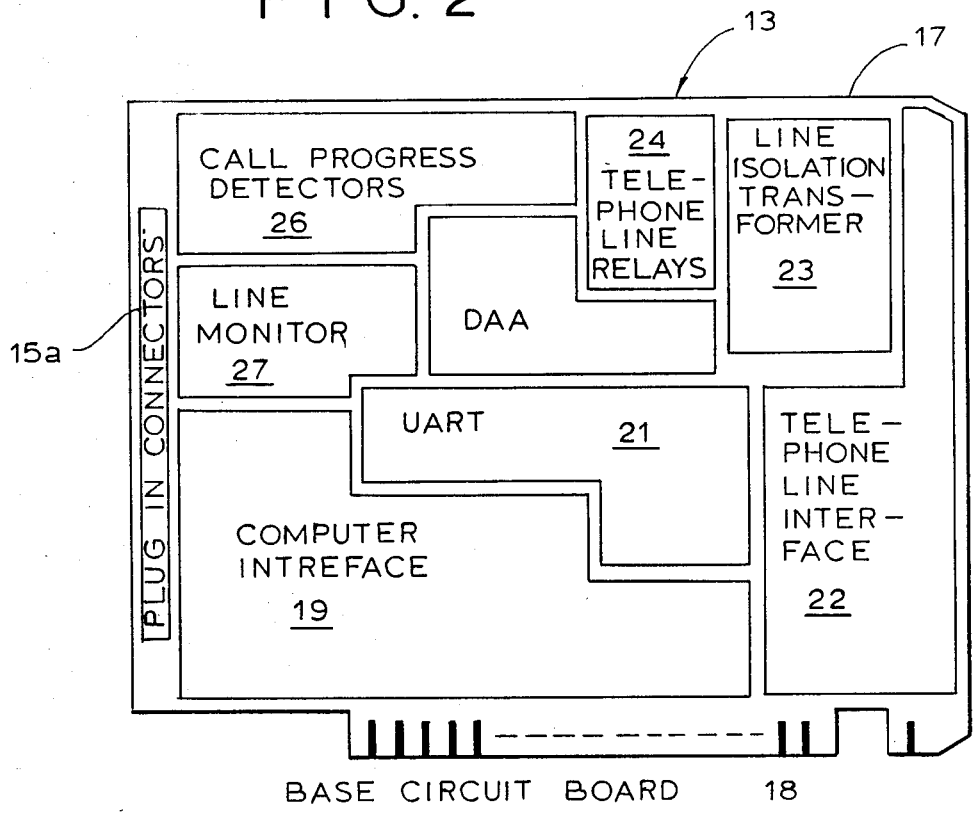
FIG. 2 is a block diagram layout of a base circuit board according to the invention.

FIG. 2 shows a typical layout of a base circuit board, which includes the circuit board proper 17, having an edge connector 18 that fits plugably into a suitable mating connector in the modem 11. The base circuit board 13 further includes a computer interface 19 for the interacting with the computer 10 and receives and transmits the data to the computer, a so-called UART (Universal Asynchronous Receive Transmit circuit) 21 which essentially converts the data to and from the computer from their parallel format to serial format as they are presented to the data line 16; a telephone line interface 22 which contains various components required for the interaction with the telephone line such as high-voltage and current protection, contact protection and so forth; a line transformer 23, which provides metallic isolation from the line and, if needed, impedance transformation, to match the line impedance; telephone line relays 24 for providing dc-control of the line such as loop closure, dialling disconnect and so forth. Call program detectors 26 monitor the line for progress tones, such as dial tone, busy ring-back and so forth, and the line monitor 27 which provides audible monitoring of the line for data carriers and voice.

FIG. 2 also shows a plug-in connector 15a for attachment of the expansion circuit board and its connection leads.

Figure 3:
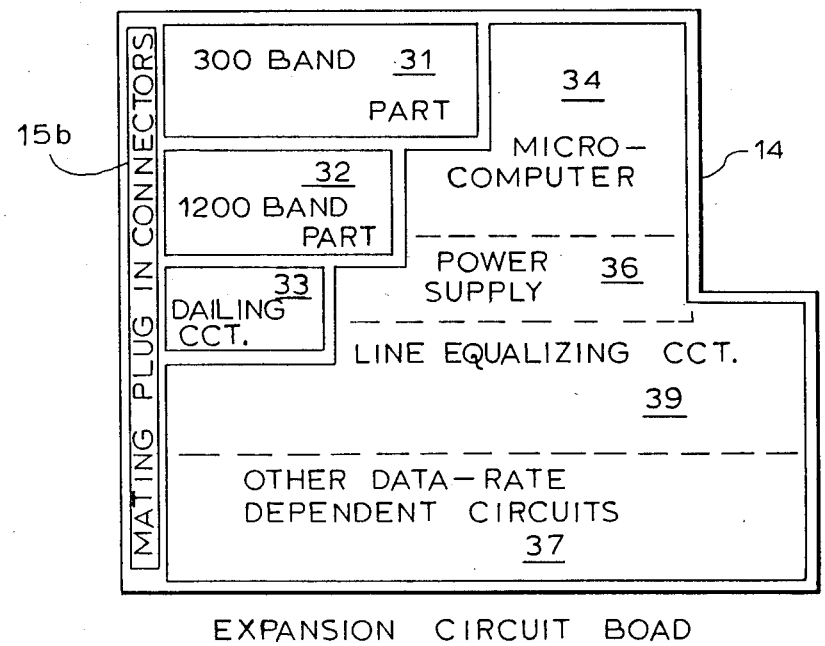
FIG. 3 is a block diagram layout of the expansion circuit board according to the invention.

FIG. 3 shows a typical set of elements of the expansion circuit board 14 which includes in the chosen illustrative embodiment two basic modem parts 31 and 32 which provide low data rate modulation and demodulation at data rates 300 and 1200 baud respectively, a micro-computer 34 with control memory containing a control program for control of the entire modem and its functions; a power supply 36 if a data rate dependent power supply is required, or if supplemental power is required at higher data rates; a line equalizing circuit 39, if required, at the higher data rates and other non-specified data-rate-dependent circuits 37, which may include special or unanticipated components and circuits, required at higher data rates. A plug-in connector 15b is provided, that mates with the plug-in connector 15a on the basic board, is provided so that the expansion board 14 can be conveniently plugged into the base board 13 when a new expansion board is required for higher data rates or unanticipated functions and features. A dialling circuit 33 may optionally be required if automatic line dialling, either by line pulsing or by tone-dialling, is a part of the modem's features.

Figure 4:
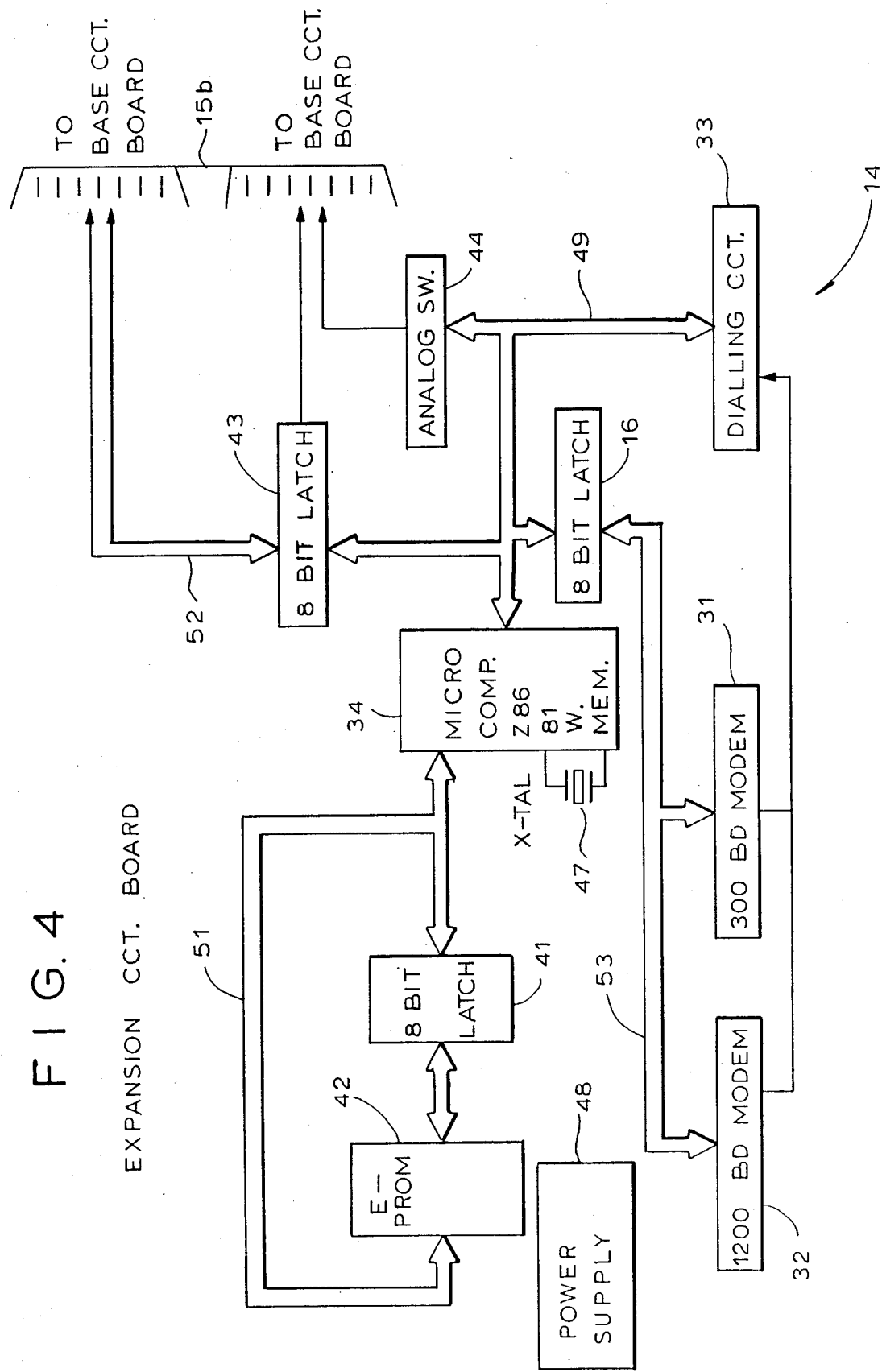
FIG. 4 is a simplified circuit diagram of the expansion circuit board.

FIG. 4 shows a circuit block diagram of the expansion board 14, including the microcomputer 34 which may advantageously be a Z8681 type made by Zilog Corp., or an other suitable type of microcomputer; the program memory 42 which may advantageously be a so-called E-PROM for storing the control programs, an 8-bit latch 41 is provided for interfacing the microcomputer 34 with the memory 42; the dialling circuit 33 which advantageously may be of the DTMF Tone-dialling type interfacing the line through an analog switch 44; the modems for 300 or 1200 Baud, 31 and 32 respectively, which communicates with other circuits via a multiconductor bus 49, as shown. Other multiconductor buses are shown as 51,52 and 53. A power supply 48 serves to provide operating voltages, and may be data-rate dependent. A clock frequency control crystal 47 serves to control the clock of the microcomputer 34.

Figure 5:
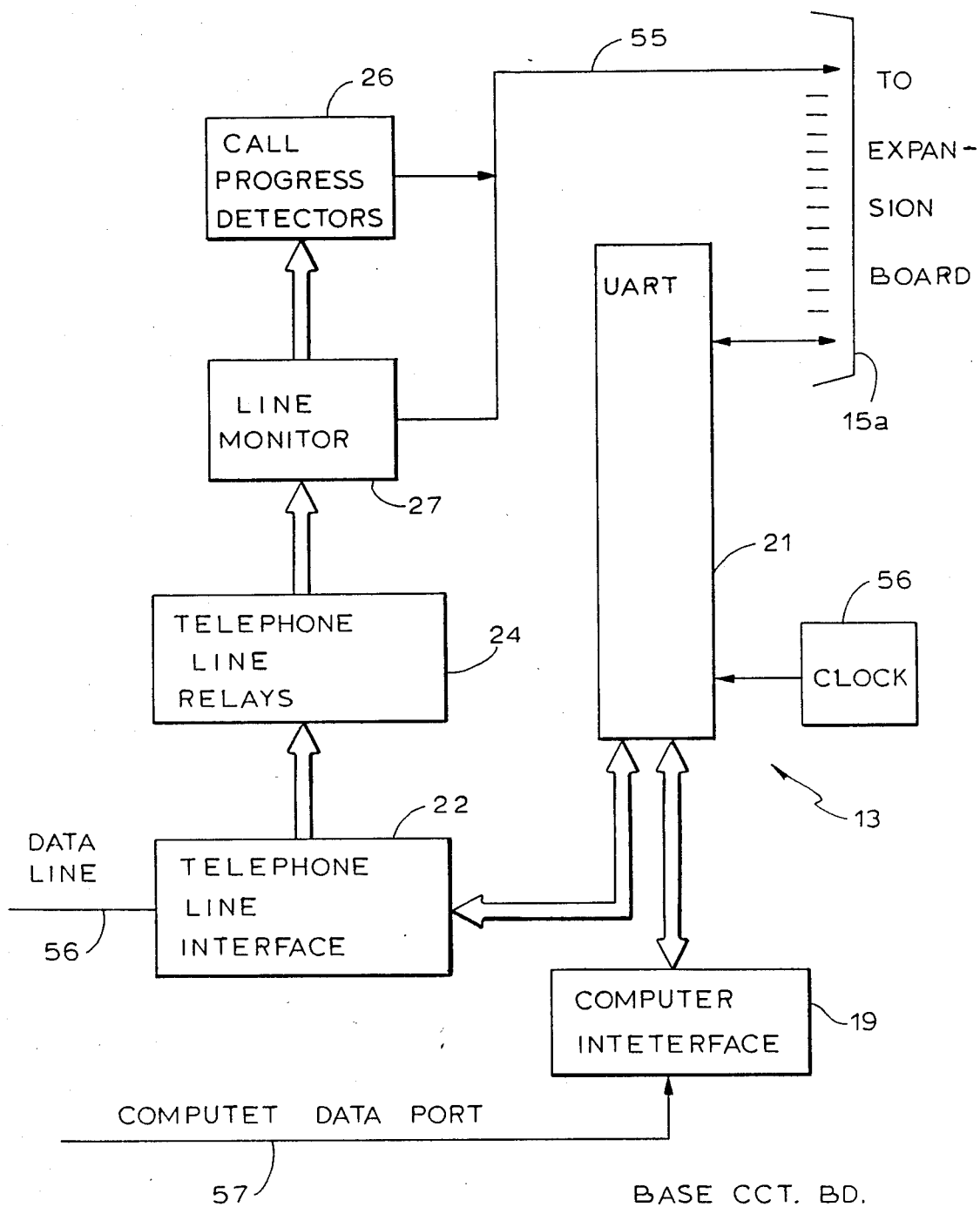
FIG. 5 is a block diagram of a base circuit board.

FIG. 5 is a schematic block diagram of the base circuit board, showing the major function block, of a typical modem according to the invention. It includes a telephone line interface 22 connected to the telephone line relays 24, the line monitor 27 for monitoring line signals from the line monitor 27 and controlling the call progress detectors 26, which are in turn connected via the bus 55 and the connector 15a to the expansion board 14. The UART 21 is connected with the line interface 22, and the computer interface 19 for data communication with the computer 10.

FIG. 6 is a more detailed circuit diagram of the circuit seen in FIG. 5, showing the base circuit board 13 with the major blocks of FIG. 5 seen in dashed lines. It follows that a number of circuit details, which need not be shown, have been omitted, since they are not directly a part of the inventive concept.

FIG. 6 shows the telephone line interface 22 and the line relays 24 combined in the block 22,24 of which the major components are the line transformer 61 and the line relays K1 and K2 with contacts that control the line. The call progress detector 26, includes a string of operational amplifiers 63 which receive call progress tones from the line transformer 61 and produce control signals converted from the call progress tones, that in turn control the various states of the modem. A line monitor 27 with a loudspeaker 64 provides audible monitoring of the call progress tones, via an amplifier 66 and volume control potentiometer 67. Computer interface 19 include an address NAND-gate 68 having an output connected to a data input NAND-gate 69, which is also controlled by a data input line 71 from the computer. The NAND-gate 69 provides data input for the UART 21, which in turn sends data to the expansion board via the connector 15a.

An optional data line equalizer 72 is shown interposed between the data line 16 and the line interface 22.

I claim:

1. A data-rate-expandable data modem for data transmission of digital data at defined data rates which comprises:
    a modem component mounting base including data line interconnection components, and computer interface components mounted thereon;
    a data rate expansion board including data modulation and demodulation components mounted thereon;
    manually detachable connecting means for detachably attaching said data rate expansion board to the modem component mounting base.

2. An expandable modem according to claim 1 wherein said expansion-board-mounted components include a modulator and a demodulator.

3. An expandable modem according to claim 2 wherein said expansion-board-mounted components include a clock generator.

4. An expandable modem according to claim 2 wherein said expansion-board-mounted components include power supply components.

5. An expandable modem according to claim 2 wherein said expansion-board-mounted components include line equalizing components.

6. An expandable modem according to claim 2 wherein said expansion-board-mounted components include a microcomputer with memory for storing a control program.

7. An expandable modem according to claim 3, wherein said expansion-board-mounted components include power supply components and line equalizing components.

8. An expandable modem according to claim 1 wherein said modem component mounting base is a printed circuit mother board.

9. An expandable modem according to claim 8 wherein said sub-base includes a printed circuit daughter board.

10. An expandable modem according to claim 1 wherein said connecting means further comprise:
    a first plug-in connector attached to said base,
    a second plug-in connector attached to said expansion board;
    said first and second plug-in connectors matingly connectable to one another.

11. An expandable modem according to claim 9 wherein said connecting means include two matingly connectable card-edge conectors.

12. An expandable modem according to claim 8 wherein said mother board is a drop-in circuit board for a personal computer.

13. An expandable modem according to claim 1 further comprising a line monitor.

* * * * *